B. G. ILLINGER.
VEGETABLE CUTTER.
APPLICATION FILED AUG. 20, 1919.

1,321,640.

Patented Nov. 11, 1919.

WITNESSES
E. A. Wilson
Geo. H. Beiler

INVENTOR
B. G. Illinger
BY Munn & Co.
ATTORNEYS

UNITED STATES PATENT OFFICE.

BENJAMIN G. ILLINGER, OF BROOKLYN, NEW YORK.

VEGETABLE-CUTTER.

1,321,640.  Specification of Letters Patent.  Patented Nov. 11, 1919.

Application filed August 20, 1919. Serial No. 318,828.

*To all whom it may concern:*

Be it known that I, BENJAMIN G. ILLINGER, a citizen of the United States, and a resident of the city of New York, borough of Brooklyn, in the county of Kings and State of New York, have invented a new and Improved Vegetable-Cutter, of which the following is a full, clear, and exact description.

This invention relates to vegetable cutters and slicers and has particular reference to devices of this character adapted particularly for use in delicatessen establishments for the making of potato and other salads in which boiled vegetables, especially potatoes, are used in large quantities.

Among the objects of the invention is to provide a utensil of a relatively cheap and yet reliable nature that is particularly adapted for slicing vegetables having a relatively soft or mushy consistency.

Another object of the invention is to provide a cutter for boiled potatoes or the like, the cutting portions of which are sharp enough to reduce the commodity acted upon and yet dull enough to prevent any possibility of the operator cutting her fingers while making the cutting stroke, even while the fingers serve to cause all portions of the potato or the like to be forced through the utensil.

A still further object of the invention is to provide a vegetable cutter adapted for cutting or slicing relatively soft or tender commodities in slices of uniform thickness when applied to either of the two sides of the utensil, while without adjustment of any part of the structure it is adapted to produce slices from one side differing in thickness from those produced from the other side, a matter of great importance in the making of vegetable salads when uniformity of slicing is attempted with any desired thickness and with the maximum speed of operation.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which Figure 1 is a plan or face view of the invention.

Figure 1:
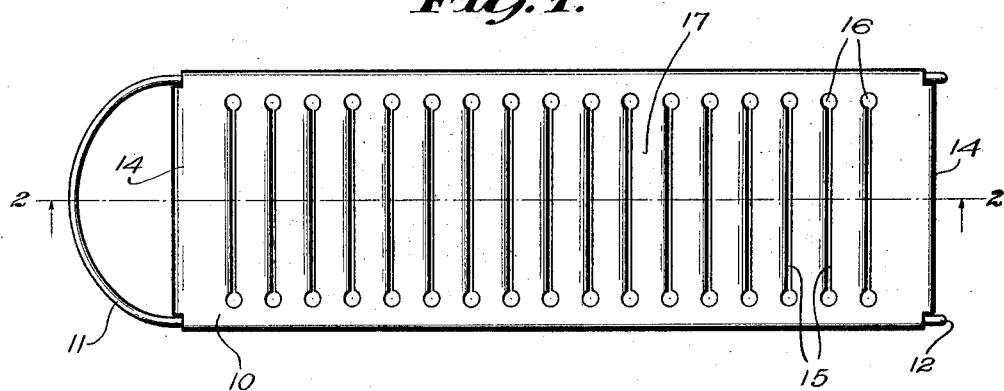

Referring now more specifically to the drawings, I show my invention as comprising a flat and substantially rectangular body portion 10, made of any suitable relatively thin but rigid material such as sheet metal of any nature suited for the purpose to insure it being sanitary.

Now taking into consideration the purpose of the device, without limiting myself unnecessarily by so doing, I may state that for a practical device, its body member 10 should be approximately 15 or 16 inches in length, and 4 inches in width.

Any suitable stiffening or frame means may be provided to support and manipulate the body 10. To this end I provide a frame 11 formed preferably of round heavy wire or its equivalent and bent into an open rounded loop in its middle portion and extending thence along the two side edges of the body and terminating in relatively sharp angular formed feet 12, serving as supports for one end of the utensil while the loop portion thereof may be held in one hand of the operator. The side edges 13 of the body, are rolled around the straight side portions of the frame between the loop and the feet in the manner well understood in the sheet metal workers art. The ends of the body 14 are suitably bent into beads or rolls to stiffen the ends and to prevent the leaving of raw or sharp edges of the structure.

Figure 4:
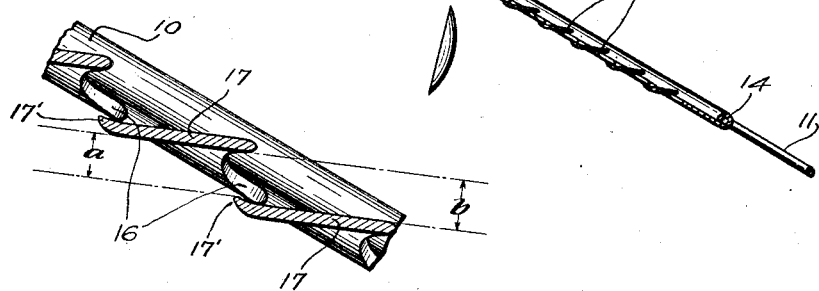
Fig. 4 is an enlarged sectional detail of one of the blades.

As indicated, the body is slitted transversely at 15, the slits being parallel and spaced uniformly from one another from practically one end of the body to the other end. At the ends of each slit are provided round holes 16 among the purposes of which is to provide for the bending of the metal along either edge or side of each slit. As indicated, the strip of material between two adjacent slits, and which may be termed a blade 17, in the formation of the device, is given a tilt at an acute angle to the general plane of the body. To produce this tilt, the blade is given a twist at each end adjacent to the two holes 16, determining such end. The blade, generally speaking, remains essentially flat throughout its length, with the exception that one edge thereof is bent at 17 down toward the plane of the body as best shown in Fig. 4.

The space indicated at $a$ between the inturned edge of one blade and the proximate flat surface of the nearest adjacent blade, is materially less than the space $b$ between the edge of the flat portion of a blade and proximate flat portion of the next adjacent blade.

Figure 2:
Fig. 2 is a longitudinal section on the line 2—2 of Fig. 1.
Figure 3:
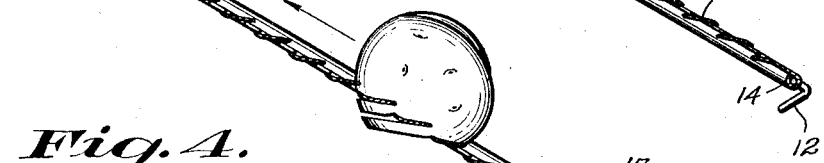
Fig. 3 is a longitudinal section on the same plane but with the implement turned end to end.

Having thus described the preferred construction of the utensil, its manner of use may be briefly summarized as follows: With the loop of the frame held in the left hand and with the device upon the feet 12, as indicated in Fig. 2, the operator will grasp one or more potatoes with her right hand and will draw the potatoes upward over the slitted surface of the body 10 and at the same time will force them through the slits. The operator in this operation and with a single stroke, will cause all of the potatoes held in her hand at the beginning to be pushed through the slitted body, and to effect this result, she may allow her fingers to drag with more or less force directly upon the cutting surface of the device with perfect impunity, since the cutting edges are sufficiently rounded or blunt to prevent any likelihood of injury to her fingers by so doing.

As indicated in the Fig. 2, the thickness of the slice will be determined by the above referred to space $a$ inasmuch as the cutting edges at this time are the ones turned downward toward the plane of the body or the next adjacent blades. Fig. 2 indicates the usual or preferred position or operation of the device, and in this position the blades assume the position in which they are the least likely to injure the operator's fingers while being drawn over and in direct contact therewith. From the consistency of a boiled potato, which naturally is somewhat flexible, it accommodates itself naturally and automatically to the making of relatively thin slices during this operation. When, however, the implement is turned over and the potatoes are forced through in the same manner as above described, the slices are materially thicker because the thickness at such time is determined in accordance with the space $b$. This is the position of the device when slicing beets or other commodities when thick slices are desired.

This device may be used for slicing cucumbers and perhaps some other species of uncooked vegetables, but it is not intended for the slicing of raw vegetables generally, and hence I wish to make a clear distinction between this implement and such implements as have one or more sharp-edged blades and are commonly used for cutting slaw, raw potatoes or other raw and relatively hard commodities.

I claim:

1. The herein described vegetable cutter comprising a plurality of similarly formed blades, the main portions of which are flat and equally spaced from one another, but each blade having a cutting edge bent toward the main portion of the next adjacent blade.

2. The herein described vegetable cutter comprising a body of rigid material and cutting means carried thereby in fixed relation to the body, said cutting means being so designed as to produce slices of different thicknesses when the commodity being cut is introduced through the opposite faces of the body.

3. The herein described vegetable cutter comprising a rigid sheet metal body transversely slitted with parallel slits thereby forming a series of blades, all of the said blades being turned to occupy positions the main portions of which are in parallel planes at equal angles to the plane of the body and each blade having one edge bent from the plane of the main portion of such blade toward the plane of the next adjacent blade whereby the width of the space between such bent edge and the next adjacent blade is materially less than the space between the planes of adjacent blades, whereby with the use of the cutter for cutting vegetables on either side the slices made by one side are materially thinner than those formed on the other side.

BENJAMIN G. ILLINGER.